No. 702,922. Patented June 24, 1902.
E. CLARK.
LAUNDRY STOVE.
(Application filed May 22, 1901.)
(No Model.)
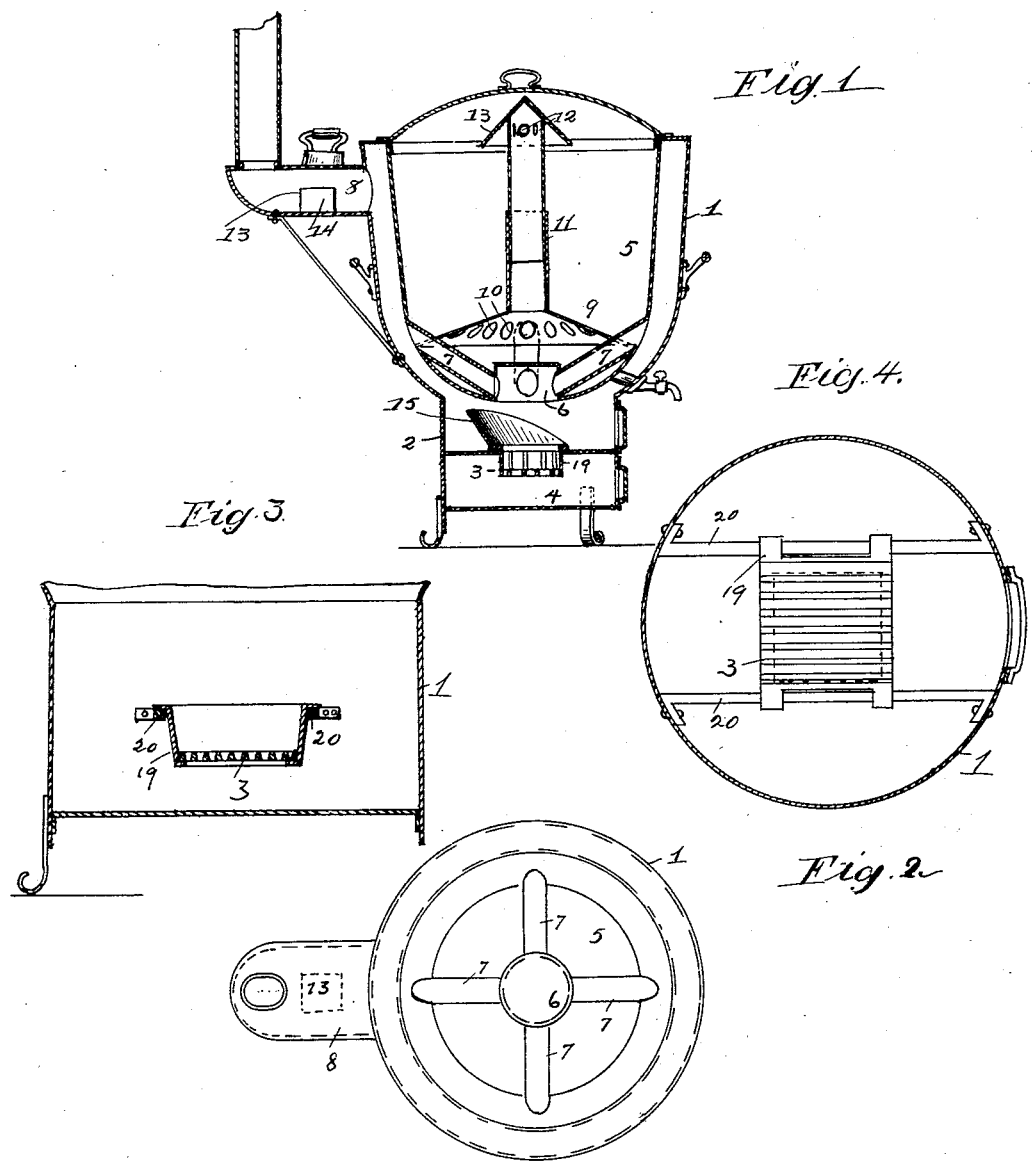
Witnesses
Geo. O. Willet
Geo. S. Kaur
Inventor
Eliza Clark
by Wm. M. Monroe
Attorney
THE NORRIS PETERS CO., PHOTO-LITHO., WASHINGTON, D. C.

UNITED STATES PATENT OFFICE.

ELIZA CLARK, OF CLEVELAND, OHIO.

LAUNDRY-STOVE.

SPECIFICATION forming part of Letters Patent No. 702,922, dated June 24, 1902.

Application filed May 22, 1901. Serial No. 61,332. (No model.)

*To all whom it may concern:*

Be it known that I, ELIZA CLARK, a citizen of the United States, and a resident of Cleveland, county of Cuyahoga, State of Ohio, have invented certain new and useful Improvements in Laundry-Stoves, of which I hereby declare the following to be a full, clear, and exact description, such as will enable others skilled in the art to which it appertains to make and use the same.

My invention relates to improvements in laundry-stoves and kettles therefor; and the especial objects of the invention are to provide a stove which will heat the water for boiling clothes with the greatest rapidity and will also provide a circulation of the water through the clothes and to obtain these results with the minimum amount of fuel. I accomplish these objects by placing the fire-grate in the close vicinity of the boiler or kettle and by providing the kettle with circulating-pipes for the heated products of combustion and with water-circulating ducts, as and in the manner hereinafter described, shown in the accompanying drawings, and specifically pointed out in the claims.

In the accompanying drawings, Figure 1 is a vertical central section through the stove and kettle. Fig. 2 is a plan view thereof. Fig. 3 is a central vertical section of the lower portion of the stove-body, which forms the ash-pit, showing also a central section of the fire-grate and its supports. Fig. 4 is a transverse section of the lower portion of the stove-body on the upper line of the grate, showing the grate and its supports in plan view.

In the views, 1 is the body portion of the stove, which is cylindrical in shape and narrowed at the lower portion at 2, where the fire-grate 3 is supported. A still lower portion forms the ash-pit 4.

The grate-box 19 is preferably supported upon bars 20, so that it can be easily removed.

The grate is shown of basket form and is placed centrally underneath the kettle 5, which may be built into the stove-body as a portion thereof or may be removable at pleasure. The lower portion of the kettle is placed closely adjacent to the narrowing part of the stove, so that only a limited portion of the heated gases arising from the grate will pass between them. The main portion of the gases, however, will pass directly upward into the central flue 6 in the bottom of the kettle and thence through the radially-placed passages 7 therein into the open space about the kettle before reaching the outlet at 8, thus circulating directly through the water in the kettle. The heat thus affects the water very quickly, and a very small amount of fuel in the basket-shaped grate will accomplish as much as a hot fire without the circulating-flues. These flues being large and located directly over the grate will receive the larger portion of the heat from the grate.

In order to increase the circulation of the water in the boiler, a cap 9 is placed over the bottom of the kettle resting upon the flues 7. This is perforated for water-admission at 10, and centrally upon this cap is placed the vertical tube 11, which extends above the water-surface and is perforated at 12 for the discharge of the water rising therein. A cap 13 on the top of the tube turns the spray downward and prevents its scattering.

The tube is made in telescoping sections, so that it can be adjusted in length to suit the water-level in the boiler.

At 13 the smoke-flue may be widened sufficiently to permit of flat-irons being placed thereon to be heated.

14 is a solid metal block arranged to absorb and retain the heat under the flat-irons.

It will be observed that the invention as described will be exceedingly economical of time and fuel, and while it is cheaply constructed and durable it is portable and convenient for all laundry purposes.

At 15 is seen a curb placed around or about the top of the fire-box, so as to prevent the fuel thrown into the latter from scattering.

In Figs. 3 and 4, 3 represents the grate-bars, 19 the basin of the grate, in the bottom of which the grate rests, and 20 represents bars which extend across the lower portion 2 of the stove, to which they are secured, and support the grate-basin.

Having described my invention, what I claim as new, and desire to secure by Letters Patent, is—

1. In a laundry-stove, the combination of a casing of less diameter at its lower portion than at its upper portion, a grate and ash-receptacle in said lower portion, a kettle in said upper portion spaced from the sides thereof, said kettle being provided with passages extending through its lower portion and affording communication between the combustion-chamber and the space about the sides of the kettle.

2. In a laundry-stove, the combination of a casing of less diameter at its lower portion than at its upper portion, a grate and ash-receptacle in said lower portion, a kettle in said upper portion spaced from the sides thereof and provided with a central flue having a closed upper extremity but open at the lower extremity, the said kettle being also provided with passages affording communication between the central flue and the space about the kettle, substantially as described.

3. In a laundry-stove, the combination of a casing of less diameter at its lower portion than at its upper portion, a kettle in the said upper portion spaced from the sides thereof, the said kettle being provided with passages extending through its lower portion and affording communication for the products of combustion between the space about the sides of the kettle and the space below the kettle, and a grate removably placed underneath the kettle, substantially as described.

4. In a laundry-stove, in combination, a casing, a kettle therein spaced from the sides thereof and provided with passages extending through its lower portion, and affording communication between the space about the kettle and the space below the kettle, a grate and ash-receptacle beneath the kettle, a perforated cap over the inside of the bottom of the kettle, a tube rising centrally therefrom and communicating below with the interior of the cap and an upper section of said tube telescoping therewith and extending above the fluid-level in the kettle, substantially as set forth.

5. In a laundry-stove, in combination, a casing of less diameter at its lower portion than at its upper portion, a kettle in the upper portion spaced therefrom, and provided with passages leading through the bottom to the space about the sides of the kettle, a grate underneath the kettle, a perforated cap within the kettle resting upon the bottom, a tube centrally communicating therewith, and provided with an extensible upper portion, the said upper portion being perforated at the top and provided with a laterally-extending cap over the perforations, substantially as described.

In testimony whereof I have signed my name to this specification in the presence of two subscribing witnesses.

ELIZA CLARK.

Witnesses:
  RUBY M. BROWNE,
  GEORGE C. HANSEN.